US012649437B2

(12) United States Patent
Jeong

(10) Patent No.: US 12,649,437 B2
(45) Date of Patent: Jun. 9, 2026

(54) METHOD TO NOTIFY EVENTS THAT OCCURRED DURING PARKING AND SYSTEM FOR THE SAME

(71) Applicants:Hyundai Motor Company, Seoul (KR); Kia Corporation, Seoul (KR)

(72) Inventor: Dong Hyuk Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/918,342

(22) Filed: Oct. 17, 2024

(65) Prior Publication Data

US 2025/0196804 A1 Jun. 19, 2025

(30) Foreign Application Priority Data

Dec. 19, 2023 (KR) ........................ 10-2023-0185930

(51) Int. Cl.

| | |
|---|---|
| *B60R 25/102* | (2013.01) |
| *B60R 25/01* | (2013.01) |
| *B60R 25/10* | (2013.01) |
| *B60R 25/24* | (2013.01) |
| *B60R 25/30* | (2013.01) |
| *H04N 5/77* | (2006.01) |
| *H04N 7/18* | (2006.01) |

(52) U.S. Cl.
CPC ............ *B60R 25/102* (2013.01); *B60R 25/01* (2013.01); *B60R 25/1004* (2013.01); *B60R 25/24* (2013.01); *B60R 25/305* (2013.01); *H04N 5/77* (2013.01); *H04N 7/183* (2013.01); *B60R 2325/205* (2013.01)

(58) Field of Classification Search
CPC ... B60R 25/102; B60R 25/01; B60R 25/1004; B60R 25/24; B60R 25/305; B60R 2325/205; H04N 5/77; H04N 7/183
USPC ........................................................ 348/148
See application file for complete search history.

(56) References Cited

U.S. PATENT DOCUMENTS

| | | | | |
|---|---|---|---|---|
| 11,518,345 B2 * | 12/2022 | Kim | ........................ | B60R 25/01 |
| 11,645,847 B2 * | 5/2023 | Liu | ....................... | H04N 23/667 |
| | | | | 348/148 |
| 11,792,455 B1 * | 10/2023 | Fu | ........................... | G06V 10/82 |
| | | | | 315/297 |
| 2016/0129883 A1 * | 5/2016 | Penilla | ................... | B60R 25/305 |
| | | | | 348/148 |
| 2018/0122223 A1 * | 5/2018 | Simon | .............. | G08B 13/19682 |
| 2018/0334137 A1 * | 11/2018 | Salter | ..................... | B60R 25/33 |

* cited by examiner

*Primary Examiner* — Thai Q Tran
*Assistant Examiner* — Nienru Yang
(74) *Attorney, Agent, or Firm* — Slater Matsil, LLP

(57) ABSTRACT

A method to notify events that occurred during parking can include acquiring a video due to occurrence of an impact event during parking to store the event as an event video, sending the stored event video to a management server, delivering the event video to a pre-registered user terminal, sensing whether the event video was read in the user terminal, informing the vehicle of non-checking of the event video, in a case where the event video was not read, determining whether the pre-registered user approaches the vehicle, and directly requesting the pre-registered user terminal to check the event video in a case where the pre-registered user approaches the vehicle, and a system for the same.

20 Claims, 2 Drawing Sheets

METHOD TO NOTIFY EVENTS THAT OCCURRED DURING PARKING AND SYSTEM FOR THE SAME

CROSS-REFERENCE TO RELATED APPLICATIONS

This application claims the benefit of Korean Patent Application No. 10-2023-0185930, filed on Dec. 19, 2023, which application is hereby incorporated herein by reference.

TECHNICAL FIELD

The present disclosure relate to a method to notify events that occurred during parking and a system for the same.

BACKGROUND

Generally, a vehicle operation recording device is installed to store records of accidents that occur mainly during vehicle operation or parking/stopping, but a reproductive function thereof is inconvenient or poor compared to a recording function thereof because a built-in liquid crystal display (LCD) should be used or the recorded video in a storage medium should be connected or moved to a personal computer (PC) for reproduction to watch the video.

In addition, a built-in LCD type vehicle operation recording device is relatively expensive because reproduction-related parts including an LCD should be included in the existing vehicle, but video resolution is not high and thus high-quality images cannot be provided.

In addition, in a case of a vehicle operation recording device in which any separate video display device is not built in, there is inconvenience that a storage medium should be separated and connected to a PC for reproduction, and when the storage medium is not connected to the vehicle operation recording device well during the course due to a user's mistake and the like, recording may not be implemented at all during the operation of the vehicle.

Recently, there have been provided vehicles in which a camera and a vehicle operation recording device are built in to fundamentally solve the above-described problems, but a driver is aware of events that occur during driving, and thus can check a minor collision accident and the like based on data stored in the vehicle operation recording device and report the accident and make the accident covered by insurance.

However, although a video was recorded due to sensing of impact from a minor collision accident and the like that occurred during parking, that is, while the driver was out of the vehicle and was not present at the site, there is a case where the driver does not recognize the impact and leaves the site by driving the vehicle.

In this case, there was a problem in that the driver cannot take a subsequent measure, for example, making the accident covered by insurance at a right time at the accident site, and even in a worst case, the driver cannot recognize the vehicle damage, and the recorded video is automatically deleted after a lapse of time, and therefore it becomes difficult to deal with the accident later.

SUMMARY

An embodiment of the present disclosure can solve the above-described problems. Embodiments of the present disclosure relate to a method to notify events that occurred during parking and a system for the same, which can deliver an impact event video to a person related to a vehicle (owner or driver) when or after an impact event occurred during parking so that the person related to the vehicle checks the impact event video when the person related to the vehicle approaches the parked vehicle or unlocks a door of the vehicle without checking the impact event video.

A method embodiment can include operations to notify events that occurred during parking and a system for the same according to an embodiment of the present disclosure, in particular, and can provide a technology of delivering an impact event video to a person related to a vehicle (owner or driver) when an impact event has occurred during parking so that the person related to the vehicle can check the impact event video when the person related to the vehicle approaches the parked vehicle or unlocks a door of the vehicle without checking the impact event video.

A method to notify events that occurred during parking according to an embodiment of the present disclosure can include: acquiring, by a vehicle, a video due to occurrence of an impact event during parking to store the event as an event video; transmitting, by the vehicle, the event video to a management server; delivering, by the management server, the event video to a user terminal of a pre-registered user; sensing, by the management server, whether the event video was read in the user terminal; informing, by the management server, the vehicle of non-checking of the event video, in response to the event video not being read; determining whether the pre-registered user approaches the vehicle; and directly requesting the user terminal of the pre-registered user to check the event video in response to the pre-registered user approaching the vehicle.

A method to notify events that occurred during parking according to an embodiment of the present disclosure can include checking for an unlock attempt and determining whether an attempt to unlock a door of the vehicle is present or not.

A method to notify events that occurred during parking according to an embodiment of the present disclosure can include determining whether the attempt to unlock the door of the vehicle has been made by a smart key having a radio frequency (RF) communication protocol, and determining whether the attempt to unlock the door of the vehicle has been made by a card key having a near-field communication (NFC) protocol.

A method to notify events that occurred during parking according to an embodiment of the present disclosure can include displaying the event video in response to determining that any one of the smart key or the card key implemented an attempt to unlock the door of the vehicle.

A method to notify events that occurred during parking according to an embodiment of the present disclosure can include determining whether the user terminal of the pre-registered user having an ultra-wideband (UWB) or Bluetooth low energy (BLE) communication protocol approaches within a preset radius of the vehicle.

A method to notify events that occurred during parking according to an embodiment of the present disclosure can include requesting the user terminal of the pre-registered user of checking the event video through the UWB or BLE communication protocol.

A method to notify events that occurred during parking according to an embodiment of the present disclosure can include stopping, by the vehicle, notifying the event that occurred during parking in response to the management server notifying the vehicle that the event video was checked through sensing.

A system to notify events that occurred during parking according to an embodiment of the present disclosure can include: an authentication key comprising a smart key or a digital key to unlock a door of a vehicle and start the vehicle; a user authentication module configured to implement unlock with at least one of the authentication keys; a camera video processing module configured to process a video acquired by at least one camera that monitors around the vehicle; a recorded video storage module configured to store an event video among videos processed by the camera video processing module; a display device configured to display the video processed by the camera video processing module or the event video stored in the recorded video storage module; and a data communication module including a UWB/BLE communication module for near field communication and configured to implement data communication with the management server.

A system to notify events that occurred during parking according to an embodiment of the present disclosure can include a control module configured to transmit an event video during parking stored in the recorded video storage module to the management server through the data communication module in response to an impact event occurring during the parking, and cause a driver to check the event video.

In a system to notify events that occurred during parking according to an embodiment of the present disclosure, the control module can be further configured to determine whether the driver approaches the vehicle in response to the management server notifying non-checking of the event video by the user, and cause the driver to check the event video during parking in response to the driver approaching the vehicle.

In a system to notify events that occurred during parking according to an embodiment of the present disclosure, the control module can be further configured to check whether an attempt to unlock the door of the vehicle is present or not through the user authentication module to determine whether the driver approaches the vehicle.

In a system to notify events that occurred during parking according to an embodiment of the present disclosure, the control module can be further configured to check whether the attempt to unlock the door of the vehicle has been made by the smart key through the user authentication module.

In a system to notify events that occurred during parking according to an embodiment of the present disclosure, the control module can be further configured to display the event video during parking stored in the recorded video storage module through the display device, in response to it being determined that the attempt to unlock the door of the vehicle has been made by any one of the smart key or the card key.

In a system to notify events that occurred during parking according to an embodiment of the present disclosure, the control module can be further configured to check whether the attempt to unlock the door of the vehicle has been made by the card key having an NFC communication protocol through the user authentication module.

In a system to notify events that occurred during parking according to an embodiment of the present disclosure, the control module can be further configured to request the digital key of the driver of checking the event video transmitted by the management server through the UWB/BLE communication module, in response to the digital key of the driver within a preset radius of the vehicle being recognized through the UWB/BLE communication module.

In a system to notify events that occurred during parking according to an embodiment of the present disclosure, the digital key of the driver can include a smartphone equipped with an app (computer program application) for implementing data communication with the management server.

In a system to notify events that occurred during parking according to an embodiment of the present disclosure, the control module can be further configured to stop notifying events that occurred during parking, in response to it being confirmed that the driver checked the event video during parking transmitted by the management server.

An embodiment of the present disclosure can provide a method to notify events that occurred during parking and a system for the same, which can deliver an impact event video to a person related to a vehicle (owner or driver) when an impact event due to a collision during parking has occurred, and, in a case where the related person does not check the impact event video and approaches the parked vehicle or unlocks a door, can have an effect of causing the related person to check the impact event video so that the related person can take a subsequent measure on the accident.

DETAILED DESCRIPTION OF ILLUSTRATIVE EMBODIMENTS

Figure 1:
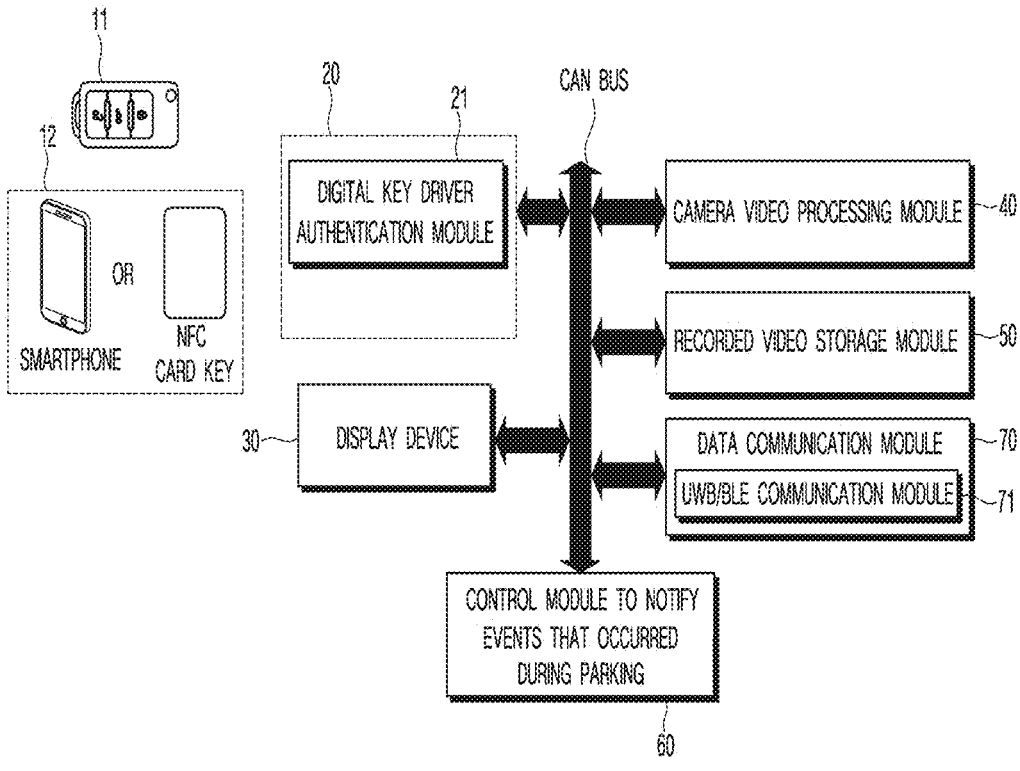
FIG. 1 is an example drawing of a block configuration of a system to notify events that occurred during parking according to an embodiment of the present disclosure.

Embodiments of the present disclosure may be modified in various ways and there may be various embodiments of the present disclosure. Specific example embodiments will be illustrated and described in the drawings. However, such specific example embodiments are not intended to necessarily limit the present disclosure to specific example embodiments, and it can be understood that the present disclosure can include all modifications, equivalents, and replacements included on the ideas and technical scopes of the present disclosure.

The suffixes "module" and "unit" used herein can be used merely for name distinction between elements and should not be construed as being necessarily physiochemically divided or separated or assumed that they may be divided or separated.

Terms including ordinals such as "first", "second", and the like, may be used to describe various elements, but the elements are not necessarily limited by such terms. Such terms can be used merely for distinguishing one element from another element, and sequential meaning between the elements can be understood from the context of the description.

The term "and/or" can be used to include any combination of a plurality of items to be included. For example, "A and/or B" can include all three cases such as "A", "B", and "A and B".

When it is mentioned that an element is "connected" or "linked" to another element, it can be understood that the element may be directly connected or linked to another element, but another element may exist in between.

The terminology used herein is for describing various example embodiments and is not intended to be necessarily limiting of the present disclosure. Singular expressions can include plural expressions, unless the context clearly indicates otherwise. In the present application, it can be understood that the term "include" or "have" indicates that a feature, a number, a step, an operation, a component, a part, or a combination thereof described in the specification exists, but does not exclude the possibility of existence or addition of one or more other features, numbers, steps, operations, components, parts, or combinations thereof in advance.

Unless otherwise defined, terms used herein, including technical or scientific terms, can include a same meaning as that generally understood by those skilled in the art. It can be understood that terms, such as those defined in commonly used dictionaries, can be interpreted as including a meaning that is consistent with their meaning in the context of the relevant art and will not be interpreted in an idealized or overly formal sense unless so defined herein.

Furthermore, the term "unit", "control unit", "control device", or "controller" can be a term widely used for naming a controller that commands a specific function, and does not necessarily mean a generic function unit. For example, a control unit by these names may include a communication device that communicates with another controller or sensor to control a corresponding function, a computer-readable recording medium that stores an operating system or a logic command, input/output information, and the like, and one or more processors that perform judgement, calculation, determination, and the like necessary for controlling the corresponding function.

The processor may include a semiconductor integrated circuit and/or electronic systems that perform at least one or more of comparison, judgement, calculation, and determination to achieve a programmed function. For example, the processor may be one of a computer, a microprocessor, a CPU, an ASIC, and an electronic circuit (circuitry, logic circuits), or a combination thereof.

Furthermore, the computer-readable recording medium (or simply referred to as a memory) can include all types of storage devices in which data which may be read by a computer system is stored. For example, the memory may include at least one type of a flash memory, of a hard disk, of a micro, of a card (for example, a secure digital (SD) card or an eXtream digital (XD) card), and the like, and at least one type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium may be electrically connected to the processor, and the processor may retrieve and record data from the recording medium. The recording medium and the processor may be integrated or may be physically separated.

Hereinafter, a method to notify events that occurred during parking and a system for the same according to example embodiments of the present disclosure will be described with reference to the accompanying drawings.

Figure 2:
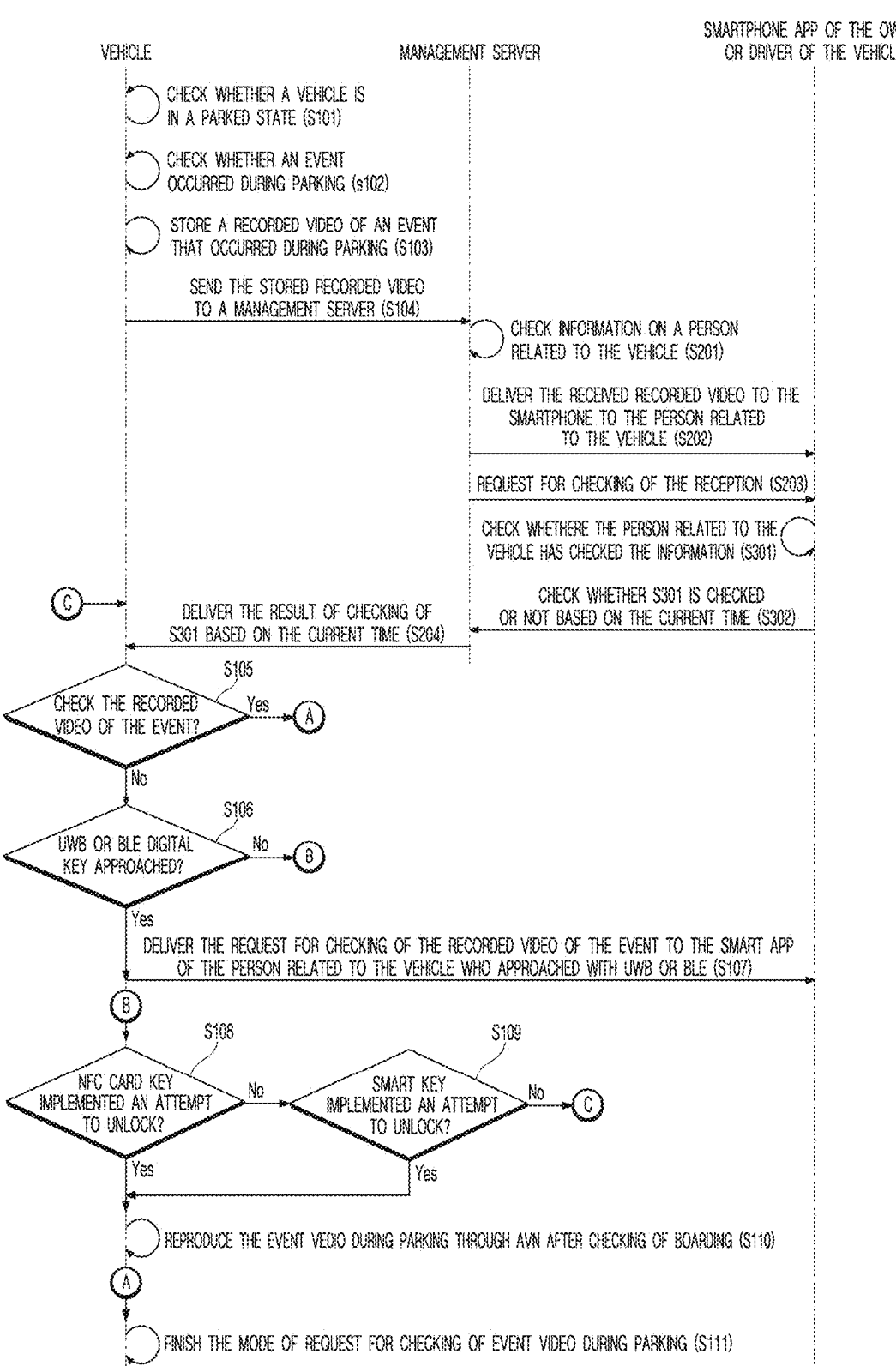
FIG. 2 is an example flow chart to explain a process of notifying events that occurred during parking according to an embodiment of the present disclosure.

The accompanying drawing FIG. 1 is an example drawing of a block configuration of a system to notify events that occurred during parking according to an embodiment of the present disclosure. FIG. 2 is an example flow chart to explain a process of notifying events that occurred during parking according to an embodiment of the present disclosure.

As illustrated in the accompanying drawing FIG. 1, the block configuration of the system to notify events that occurred during parking according to an embodiment of the present disclosure can include: a smart key 11 having a RF communication protocol to unlock a door of a vehicle and start the vehicle; at least two or more digital keys 12 having two kinds of protocols to unlock the door of the vehicle and start the vehicle; a body domain controller (BDC) 20 having a user authentication module 21 that can implement unlock function of the door by authenticating the smart key 11 or the digital keys 12; a camera video processing module 40 that can process a video acquired from a camera (not illustrated) that carefully watches interior and exterior of the vehicle; a recorded video storage module 50 that can store a video related to the event among videos acquired by the camera video processing module; a display device 30 that can display the video acquired by the camera video processing module 40 or the event video stored in the recorded video storage module 50; a data communication module 70 that can include a near-field data communication module, such as a UWB/BLE communication module 71 for near field communication and a long-range data communication module configured to implement data communication with a management server (not illustrated); and a control module 60 to notify events that occurred during parking, which can deliver an event video during parking stored in the recorded video storage module 50 to the management server through the data communication module 70 when a collision event occurs in a parked state in which the driver is out of the vehicle, and, in a case where the driver approaches the vehicle, causes the driver to check the event video during parking due to a check signal that the driver does not check the event video during parking, delivered by the management server, any combination of or all of which may be in plural or may include plural components thereof.

Each of the modules can be realized by the memory in which a program to implement the corresponding function can be stored and the processor that implements the program, each memory of the modules can be integrated into one or more memories, and each processor can be integrated into one or more processors.

Referring to FIG. 2, in operation S101, it can be checked whether a vehicle is in a parked state.

When it is confirmed in operation S101 that the vehicle is in a parked state, operation S102 can proceed to check whether an impact event occurred.

When it is determined in operation S102 that an impact event occurred during parking, operation S103 can proceed to store a recorded video due to the impact event in the recorded video storage module 50.

When the recorded video due to the impact event during parking is stored in the recorded video storage module 50 in operation S103, operation S104 can proceed to send the recorded video due to the impact event during parking to the management server through the data communication module 70.

When the management server receives the recorded video due to the impact video during parking sent through the course of operation S104, operation S201 can proceed to check information of the person related to the vehicle through meta data (generally, information included in video data, for example, time of recording video, and agent that takes video (vehicle, owner, and the like) can be included in the recorded video due to the impact event during parking).

When information of the person related to the vehicle is checked through the course of operation S201, the corresponding checked information can be delivered to a smartphone (or smartphone app) of the person related to the vehicle through the course of operation S202.

In addition, it can be requested whether the recorded video due to the impact event during parking delivered through the course of operation S202 is checked or not through the course of operation S203.

The smartphone of the person related to the vehicle that received the request for checking and the recorded video through the course of operations S202 and S203 can sense whether the person related to the vehicle checks the information through the course of operation S301, and deliver the sensed result to the management server through the course of operation S302.

At this time, the courses of operation S301 and S302 can be continuously repeated, and the real-time sensed result can be delivered to the management server.

The management server can deliver the checked result of operation S301 sent by the smartphone of the person related to the vehicle through the course of operation S302 to the vehicle through the course of operation S204.

The vehicle can check whether the person related to the vehicle checked the recorded video due to the impact video during parking through the course of operation S105. When it is determined that the person related to the vehicle did not check the recorded video in operation S105, operation S106 can proceed to determine whether the person related to the vehicle approaches the vicinity of the vehicle.

At this time, a basis for determination in operation S106 can be to determine whether the smartphone possessed by the person related to the vehicle communicates with the UWB or BLE communication protocol through the UWB/BLE communication module 71.

Generally, communication with the UWB/BLE communication protocol can be performed within a radius of 5 m to 20 m from the vehicle, and thus, in a case where there is a smartphone possessed by the person related to the vehicle within the radius, it can be determined that the person related to the vehicle approached the vicinity of the vehicle.

At this time, in a case where it is determined that the person related to the vehicle approached the vicinity of the vehicle in operation S106, operation S107 can proceed to directly implement request for checking of the recorded video due to the impact event during parking delivered to the smartphone possessed by the person related to the vehicle through the UWB/BLE communication module 71 by the management server through the course of operation S202.

When it is determined that the person related to the vehicle did not approach the vicinity of the vehicle in operation S106, operation S108 can proceed to determine whether an NFC card key implemented an attempt to unlock the door of the vehicle.

If it is determined that the NFC card key did not implement an attempt to unlock the door of the vehicle in operation S108, operation S109 can proceed to determine whether the smart key (11) implemented an attempt to unlock the door of the vehicle.

When it is determined that the smart key 11 did not implement an attempt to unlock the door of the vehicle in operation S109, operation S105 can be re-proceeded to repeatedly implement the above-described course.

When it is determined that the NFC card key or the smart key 11 implemented an attempt to unlock the door of the vehicle in operation S108 or operation S109, operation S110 can proceed. In operation S110, the NFC card key or the smart key 11 can unlock the door of the vehicle, and the display device 30 can be driven to display the recorded video due to the impact event during parking stored in the recorded video storage module 50 to a seated occupant.

Therefore, the occupant seated in the vehicle can recognize that the impact event occurred during parking of the vehicle and can take a subsequent measure.

The foregoing descriptions of example embodiments of the present disclosure have been presented for purposes of illustration and description. The example embodiments are not intended to necessarily limit embodiments of the present disclosure to the specific example embodiments disclosed. Various modifications can be possible by those skilled in the art without departing from the scopes of the present disclosure claimed in claims.

What is claimed is:

1. A method of notifying of events that occurred during parking, the method comprising:
  acquiring, by a vehicle, a video due to occurrence of an impact event during the parking to store the video of the impact event as an event video;
  transmitting, by the vehicle, the event video to a management server;
  delivering, by the management server, the event video to a user terminal of a pre-registered user;
  sensing, by the management server, whether the event video was read in the user terminal or not;
  informing, by the management server, the vehicle that the event video has not been read by the pre-registered user, in response to sensing whether the event video was read or not;
  determining whether the pre-registered user approaches the vehicle; and
  directly requesting, by the vehicle, through a near-field communication module, the user terminal of the pre-registered user to check the event video in response to being informed that the event video has not been read by the pre-registered user and the pre-registered user approaching the vehicle.

2. The method of claim 1, wherein determining whether the pre-registered user approaches the vehicle includes an unlock attempt checking and determining whether an attempt to unlock a door of the vehicle is present or not.

3. The method of claim 2, wherein the unlock attempt checking includes:
  determining whether the attempt to unlock the door of the vehicle has been made by a smart key having a radio frequency communication protocol; and
  determining whether the attempt to unlock the door of the vehicle has been made by a card key having a near-field communication protocol.

4. The method of claim 3, wherein directly requesting the user terminal of the pre-registered user to check the event video includes displaying the event video in response to determining that the smart key or the card key implemented the attempt to unlock the door of the vehicle.

5. The method of claim 2, wherein determining whether the pre-registered user approaches the vehicle further includes determining whether the user terminal of the pre-registered user using an ultra-wideband or low-power wireless communication protocol approaches within a preset radius of the vehicle.

6. The method of claim 5, wherein directly requesting the user terminal of the pre-registered user to check the event video further includes requesting the user terminal of the pre-registered user to check the event video through the ultra-wideband or low-power wireless communication protocol.

7. The method of claim 1, further comprising stopping, by the vehicle, notifying of the impact event that occurred during the parking in response to the management server notifying the vehicle that the event video was checked through sensing whether the event video was read in the user terminal or not.

8. A system configured to notify of events that occurred during parking, the system comprising:

an authentication key including a smart key or a digital key configured to unlock a door of a vehicle and start the vehicle;

a user authentication module configured to implement unlock with the authentication key;

a camera configured to obtain an event video based on occurrence of an impact event while the vehicle is parked;

a camera video processing module configured to process the event video acquired by the camera;

a recorded video storage module configured to store the event video;

a display device configured to display the event video stored in the recorded video storage module;

a long-range data communication module configured to implement data communication with a management server to transmit the event video to the management server and receive information of the event video having not been read by a pre-registered user from the management server; and a near-field data communication module configured to provide near field communication with a user terminal to directly request the user terminal of the pre-registered user to check the event video in response to the information of the event video having not been read by the pre-registered user being received and the pre-registered user approaching the vehicle.

9. The system of claim 8, further comprising a control module configured to:

transmit the event video stored in the recorded video storage module to the management server through the long-range data communication module in response to the impact event occurring during the parking; and cause a driver to check the event video.

10. The system of claim 9, wherein the control module is further configured to:

determine whether the driver approaches the vehicle in response to the management server notifying non-checking of the event video by the pre-registered user; and cause the driver to check the event video during parking in response to the driver approaching the vehicle.

11. The system of claim 10, wherein the control module is further configured to check whether an attempt to unlock the door of the vehicle is present or not through the user authentication module to determine whether the driver approaches the vehicle.

12. The system of claim 11, wherein the control module is further configured to check whether the attempt to unlock the door of the vehicle has been made by the smart key through the user authentication module.

13. The system of claim 12, wherein the control module is further configured to display the event video through the display device, in response to determining that the attempt to unlock the door of the vehicle has been made by the smart key or the digital key.

14. The system of claim 11, wherein the control module is further configured to check whether the attempt to unlock the door of the vehicle has been made by the digital key having a near-field communication protocol through the user authentication module.

15. The system of claim 11, wherein the near-field data communication module comprises a wireless communication module and wherein the control module is further configured to request the digital key of the driver to check the event video transmitted by the management server through the wireless communication module, in response to the digital key of the driver within a first radius of the vehicle being recognized through the wireless communication module.

16. The system of claim 15, wherein the digital key of the driver comprises a smartphone equipped with an app for implementing data communication with the management server.

17. The system of claim 9, wherein the control module is further configured to stop notifying of the events that occurred during the parking, in response to confirming that the driver checked the event video transmitted by the management server.

18. A system configured to notify of events that occurred during parking of a vehicle, the system comprising:

a user authentication module configured to implement unlock of the vehicle with an authentication key;

a recorded video storage module configured to store an event video related to the vehicle;

a display device configured to display the event video;

a wireless communication module; and a control module configured to:

transmit the event video to a management server through the wireless communication module in response to an impact event occurring during the parking, determine whether a driver approaches the vehicle in response to the management server notifying non-checking of the event video by the driver, cause the driver to check the event video in response to determining that the driver approached the vehicle without having checked the event video through the management server, check whether an attempt to unlock a door of the vehicle is present or not through the user authentication module to determine whether the driver approaches the vehicle, check whether the attempt to unlock the door of the vehicle has been made by a smart key or a digital key through the user authentication module, display the event video through the display device, in response to determining that the attempt to unlock the door of the vehicle has been made by the smart key or the digital key, and stop notifying of the events that occurred during parking, in response to confirming that the driver checked the event video transmitted by the management server.

19. The system of claim 18, wherein the control module is further configured to request the digital key of the driver to check the event video transmitted by the management server through the wireless communication module, in response to the digital key of the driver within a first radius of the vehicle being recognized through the wireless communication module.

20. The system of claim 19, wherein the digital key of the driver comprises a smartphone equipped with an app for implementing data communication with the management server.

* * * * *